United States Patent
Wölfing et al.

(10) Patent No.: US 10,180,522 B2
(45) Date of Patent: Jan. 15, 2019

(54) OPTICAL ELEMENT AND LIGHTING DEVICE WITH AN OPTICAL ELEMENT

(71) Applicant: SCHOTT AG, Mainz (DE)

(72) Inventors: Bernd Wölfing, Mainz (DE); Andreas Schneider, Neu-Bamberg (DE)

(73) Assignee: SCHOTT AG, Mainz (DE)

( * ) Notice: Subject to any disclaimer, the term of this patent is extended or adjusted under 35 U.S.C. 154(b) by 151 days.

(21) Appl. No.: 15/159,361

(22) Filed: May 19, 2016

(65) Prior Publication Data

US 2016/0259109 A1    Sep. 8, 2016

Related U.S. Application Data

(63) Continuation of application No. PCT/EP2014/075297, filed on Nov. 21, 2014.

(30) Foreign Application Priority Data

Nov. 22, 2013  (DE) .......................... 10 2013 112 905

(51) Int. Cl.
*F21V 8/00*       (2006.01)
*G02B 6/24*       (2006.01)
(Continued)

(52) U.S. Cl.
CPC ......... *G02B 6/0016* (2013.01); *G02B 6/0028* (2013.01); *G02B 6/0031* (2013.01);
(Continued)

(58) Field of Classification Search
CPC .. G02B 6/0046; G02B 6/0075; G02B 6/0028; G02B 6/0018; G02B 6/0078; G02B 6/0045; G02B 6/0031; G02B 6/0016
See application file for complete search history.

(56) References Cited

U.S. PATENT DOCUMENTS 4,954,930 A * 9/1990 Maegawa ............ G02B 6/0033
                                                  362/23.15
6,092,904 A    7/2000 Tai et al.
(Continued)

FOREIGN PATENT DOCUMENTS

DE         19942513 A1    3/2001
DE     102005042523 A1   12/2006
(Continued)

OTHER PUBLICATIONS

English translation of the International Search Report dated May 28, 2015 for corresponding International Application No. PCT/EP2014/075297.

(Continued)

*Primary Examiner* — Karabi Guharay
(74) *Attorney, Agent, or Firm* — Ohlandt, Greeley, Ruggiero & Perle, L.L.P.

(57) ABSTRACT

An optical arrangement is provided that includes a first optical element comprising a light guide that has a bevel face and a second optical element. The first optical element conducts light by total internal reflection at a wall and has a light entry area defined by a non-beveled end face and a light exit area formed by a surface area of the wall at that end proximate the bevel face. The second optical element has a light entry aperture arranged on or facing the light exit area. The light entry area has a width x and the light entry aperture has a height z, which meet the following relationship:

$$x/z \leq 1.5 \cdot [\tan(90°-\alpha/2) - \tan(90°-(2\cdot[\alpha/2+90°]-[180°-\arcsin(1/n)]))]^{-1}.$$

Herein, $\alpha$ denotes the deflection angle of the light at the bevel face and n denotes the refractive index of the material of the first optical element.

18 Claims, 11 Drawing Sheets

(51) Int. Cl.
*F21Y 115/10* (2016.01)
*F21Y 113/13* (2016.01)

(52) U.S. Cl.
CPC ......... *G02B 6/0046* (2013.01); *G02B 6/0075* (2013.01); *F21Y 2113/13* (2016.08); *F21Y 2115/10* (2016.08)

(56) References Cited

U.S. PATENT DOCUMENTS

| | | |
|---|---|---|
| 2004/0061814 A1 | 4/2004 | Kim et al. |
| 2005/0046807 A1 | 3/2005 | Hanano |
| 2006/0126178 A1 | 6/2006 | Li |
| 2007/0116424 A1 | 5/2007 | Ting et al. |
| 2008/0239748 A1 | 10/2008 | Hatzenbuehler et al. |
| 2009/0201698 A1 | 8/2009 | Klick et al. |
| 2010/0033988 A1 | 2/2010 | Chiu et al. |
| 2012/0014127 A1 | 1/2012 | Kanade et al. |
| 2013/0077341 A1 | 3/2013 | Kawai et al. |
| 2016/0138772 A1* | 5/2016 | Sato ............ G02B 6/0036 362/511 |

FOREIGN PATENT DOCUMENTS

| | | |
|---|---|---|
| DE | 102007014871 A1 | 10/2008 |
| DE | 102012022716 A1 | 5/2013 |
| WO | 2004001456 A2 | 12/2003 |
| WO | 2010013181 A1 | 2/2010 |

OTHER PUBLICATIONS

Written Opinion dated May 28, 2015 for corresponding International Application No. PCT/EP2014/075297.
International Preliminary Report on Patentability dated May 28, 2015 for corresponding International Application No. PCT/EP2014/075297.

* cited by examiner

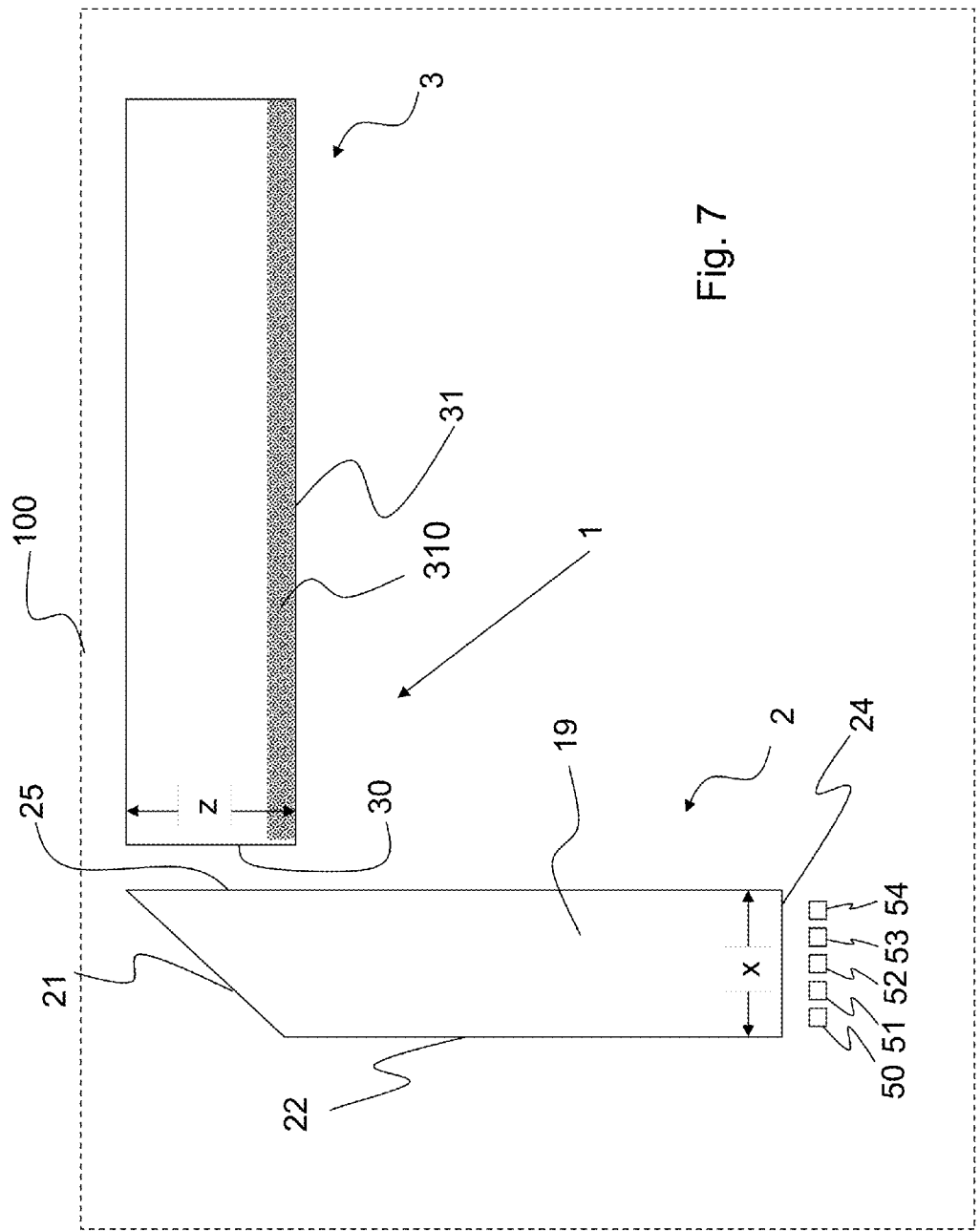

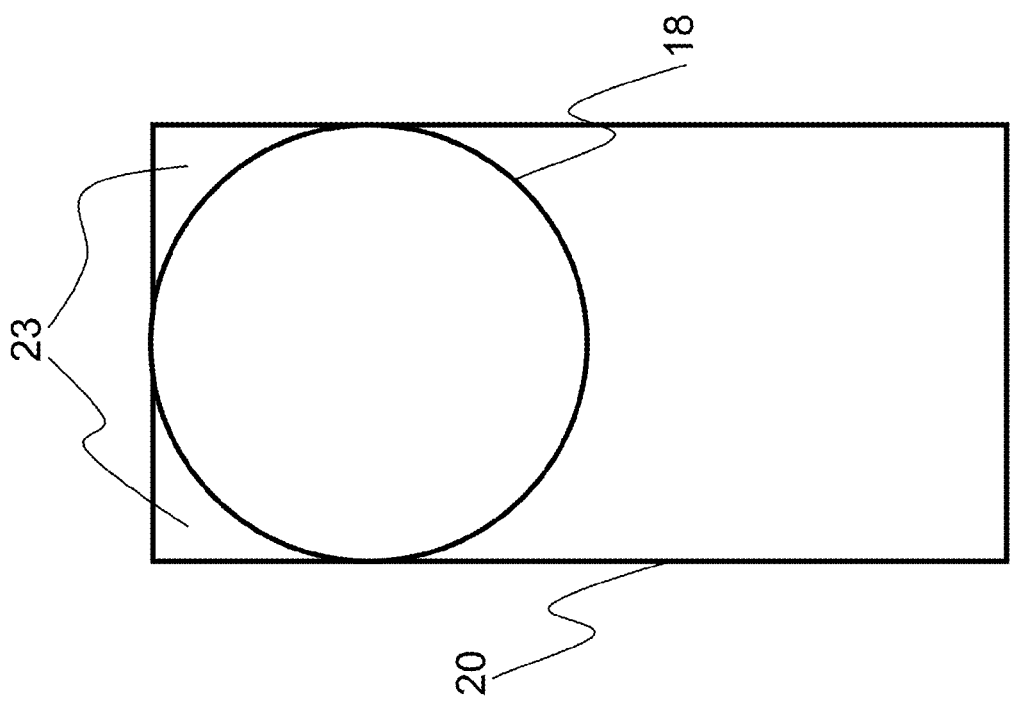

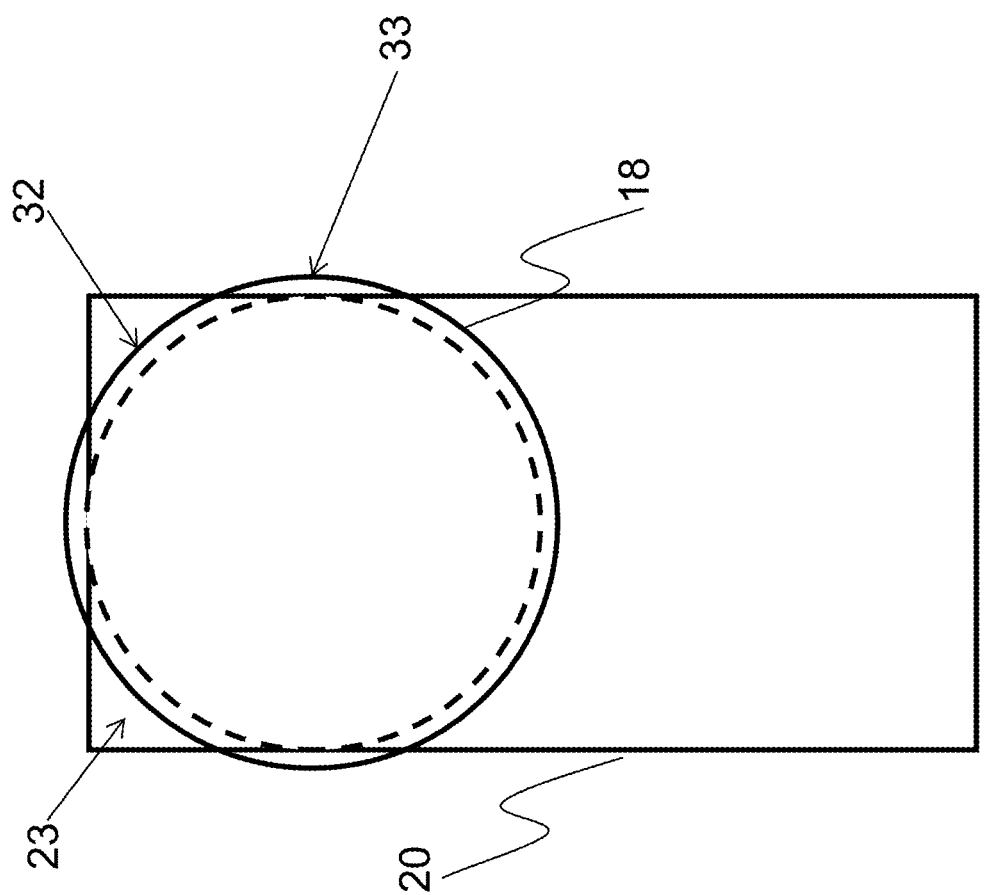

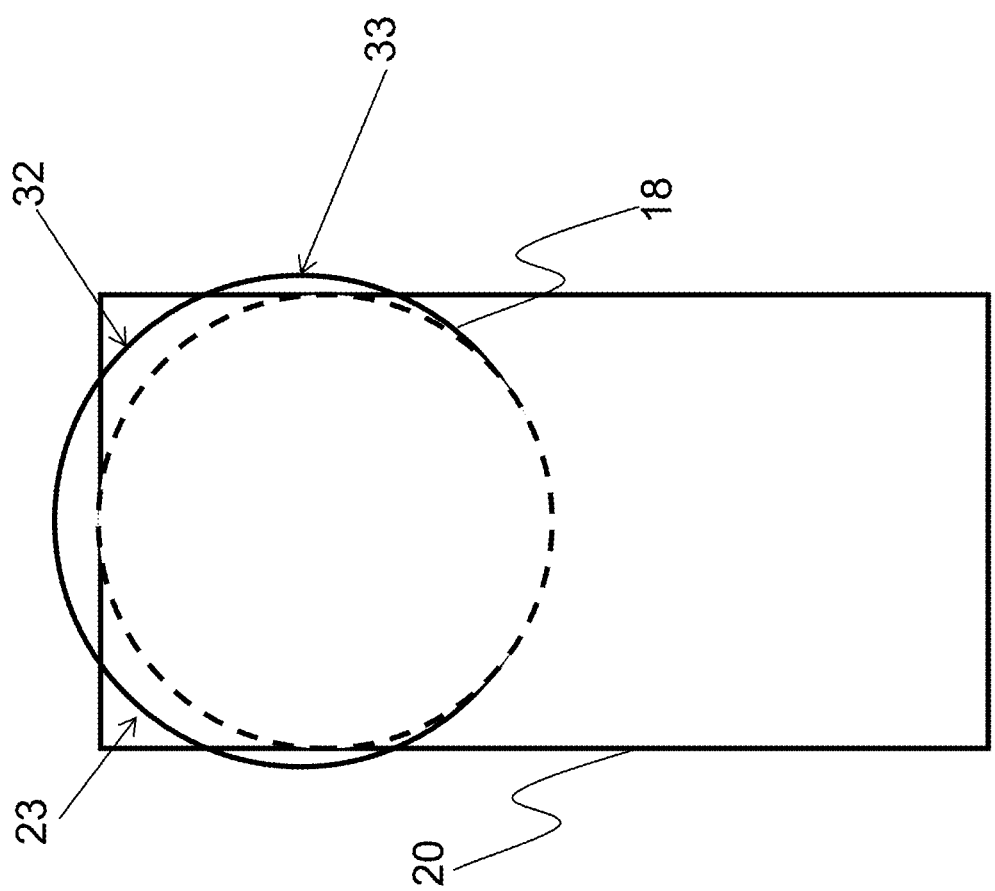

OPTICAL ELEMENT AND LIGHTING DEVICE WITH AN OPTICAL ELEMENT

CROSS REFERENCE TO RELATED APPLICATIONS

This application is a continuation of International Application No. PCT/EP2014/075297 filed on Nov. 21, 2014, which claims benefit under 35 U.S.C. § 119(a) of German Patent Application No. 10 2013 112 905.6 filed Nov. 22, 2013, the entire contents of both of which are incorporated herein by reference

BACKGROUND

1. Field of the Invention

The invention generally relates to light sources capable of mixing light colors using a plurality of colored light-emitting elements.

2. Description of Related Art

LEDs are increasingly employed for lighting purposes for instance in vehicles and building interiors, e.g. in aircraft cabins. LEDs are particularly suitable in these fields because of their low energy consumption and low operating voltage.

For example, WO 2010/013181 A1 discloses an optical element with a light transmitting region having a constant cross section over the entire length thereof. Adjacent to this light transmitting region in the direction of the light beams is a light collimating region that has a cross section increasing in the propagation direction of light. The end of the light collimating region is defined by an inclined reflector. The light reflected at this reflector exits the optical element substantially perpendicularly to the propagation direction of the light in the light transmitting region. The light collimating region may have various geometric shapes.

DE 10 2012 022 716 A1 discloses a method for injecting light into and mixing in a light guide. The light is injected into the light guide substantially perpendicularly to the latter, impinges onto an inclined reflector and is reflected by the latter into the light guide. Mixing of the light is accomplished by total internal reflection of the light beams at the inner walls of the light guide.

The described prior art light mixers exhibit a high degree of symmetry which is quite advantageous for a pure light mixer.

However, if the optical element has a deflection function, the symmetrical configuration proves to be disadvantageous for a most efficient exploitation of the light in additional downstream optical systems.

SUMMARY

The invention is therefore based on the object to provide an optical arrangement which exhibits higher efficiency in exploiting the light in downstream optical systems than the prior art.

This object is achieved by the subject matter of claim 1. Advantageous embodiments and refinements of the invention are specified in the dependent claims.

Accordingly, the invention provides an optical arrangement which comprises a first optical element in the form of or comprising a light guide obliquely beveled with a bevel face, and a second optical element, wherein the first optical element conducts light by total internal reflection at the wall thereof and has a light entry area defined by the non-beveled end face of the light guide, and has a light exit area, wherein the light exit area is defined by a surface area of the wall at that end of the light guide at which the bevel face is arranged. The second optical element has a light entry aperture which is arranged on the light exit area of the first optical element or faces the light exit area of the first optical element, and the light entry area of the first optical element has a width x measured in the direction along the intersection of the light entry area with the plane of light deflection at the bevel face, and the light entry aperture of the second optical element has a height z measured in the direction along the intersection of the light exit area of the first optical element with the plane of light deflection at the bevel face.

The width x and the height z meet the following relationship:

$$x/z \leq 1.5 \cdot [\tan(90°-\alpha/2)-\tan(90°-(2\cdot[\alpha/2+90°]-[180°-\arcsin(1/n)]))]^{-1}. \quad (1).$$

Herein, $\alpha$ denotes the deflection angle of the light at the bevel face, and n denotes the refractive index of the material of the first optical element. Without limiting generality, the coordinate system has been chosen so that deflection of the light only occurs in the x-z plane. The deflection angle herein is the deflection angle of a light ray which passes through the light guide along the longitudinal extension of the light guide, that means which is not reflected at the sidewall of the light guide.

With the deflection in a light mixer, the entry face of the light mixer is apparently imaged to the exit area thereof. However, this apparently obvious relationship is not true for radiation beams having an angular distribution with a typical FWHM (full width at half maximum) of $\alpha$>0, which is the reason for the loss in efficiency in the further exploitation of the light in downstream optical systems already mentioned above. With the relationship given above, the dimension z of the entry aperture that lies in the deflection plane of the light becomes greater than the width x of the light entry area of the first optical element, which is likewise measured in the direction of the deflection plane of the light.

In terms of efficiency, large values of the dimension z are favorable, however, the increase of intensity that can be injected into the second optical element decreases for large values of z, while the second optical element becomes more and more voluminous. Therefore, it is advantageous according to a further embodiment of the invention, if the height z of the second optical element is limited in relation to the width of the light entry area of the first optical element. Specifically, it is therefore contemplated according to a further embodiment of the invention, that the dimensions x and z additionally meet the following relationship:

$$x/z \geq 0.85 \cdot [\tan(90°-\alpha/2)-\tan(90°-(2\cdot[\alpha/2+90°]-[180°-\arcsin(1/n)]))]^{-1}. \quad (2)$$

In a preferred embodiment, the deflection angle at the bevel face of the first optical element ranges from 75° to 105°.

The light guide of the first optical element preferably has the shape of a prism, and the light entry area thereof is defined by the non-beveled base of the prism. A prism in the sense of the invention is a body which is formed by parallel displacement of a base, that means in the case of the invention by parallel displacement of the light entry area. The base need not necessarily be angular. Rather, the base or the cross-sectional area of the prism may have round circumferential sections as well.

The cross-sectional area of the light guide has a shape whose dimension is monotonically expanding in a direction from the surface facing away from the second optical element towards the second optical element and is strictly monotonically expanding in at least one section along this direction.

In this case, the light guide may have two opposite flat faces, wherein one of the faces includes the light exit area, and the face that includes the light exit area is wider than the opposite face. Specifically, the cross-sectional dimension is largest at the light exit area.

Such cross-sectional shapes have turned out to be particularly favorable for the efficiency of the optical system. With such cross-sectional shapes it is achieved that light escaping at the light exit area so that it does not enter into the entry aperture of the downstream optical element is kept minimal.

Therefore, according to another aspect of the invention, irrespective of whether a second optical element is provided which is optically coupled with the first optical element, an optical element 2 is provided in the form of or comprising a prism-shaped light guide 19 obliquely beveled with a bevel face 21, wherein the first optical element 2 conducts light by total internal reflection at the wall 22 thereof; and has a light entry area 24 defined by the non-beveled end face of the light guide 19; and has a light exit area 25, wherein the light exit area 25 is defined by a surface area of the wall 22 at that end of the light guide 19 at which the bevel face 21 is arranged; wherein the cross-sectional area of the light guide 19 has a shape with dimensions monotonically expanding in a direction from the surface facing away from the second optical element 3 towards the second optical element 3, and strictly monotonically expanding in at least one section along this direction.

In a preferred embodiment, the optical arrangement is configured so that the bevel face extends at an angle of 45° to the longitudinal extension of the light guide, so that the light conducted in the light guide is deflected by 90° at the bevel face. In this case, the height of the light entry aperture the second optical element and the width x of the light entry area of the first optical element meet the following relationship:

$$x/z \leq 1.5 \cdot [1+\tan(\arcsin(1/n))]^{-1}, \quad (3)$$

wherein n is the refractive index of the material of the first optical element.

Preferably, the ratio x/z additionally meets the following relationship:

$$x/z \geq 0.85 \cdot [1+\tan(\arcsin(1/n))]^{-1}. \quad (4)$$

The shape of the light entry aperture of the second optical element of the optical arrangement preferably has an aspect ratio from 0.8:1 to 1.2:1, more preferably from 0.9:1 to 1.1:1, most preferably of 1:1, for two mutually perpendicular directions. It is especially with such aspect ratios of about 1:1 and light deflection that the invention provides for a high coupling efficiency.

The material of the first optical element preferably has a refractive index of at least 1.4 for visible light. Thus, the opening angle for the injected light is kept small, and light from a large solid angle can be injected. Preferably, the refractive index of the first optical element is in a range from 1.4 to 2.1, most preferably not more than 2.0. Common suitable optical glasses have a refractive index in this range, and typical refractive indices range up to n=1.9. Therefore, a refractive index for visible light from 1.4 to 1.9 is particularly preferred.

Furthermore, according to one embodiment of the invention it is contemplated that the inventive optical arrangement is part of a lighting device which comprises a plurality of light-emitting elements that differ from each other in the color of the emitted light, wherein the light-emitting elements are arranged so as to inject their light into the light entry area of the first optical element.

According to a preferred embodiment of the invention, the second optical element comprises a light guide into which light is injected which is emitted from the first optical element. The light guide has light-scattering features along its longitudinal extension, which scatter the injected light out of the light guide.

It is particularly useful to inject the light into the light guide directly through the end face thereof. Accordingly, the second optical element is formed by the light guide and the light entry aperture of the second optical element is defined by an end face of the light guide that faces the light exit area of the first optical element. Thus, the light is injected into the light guide via an end face thereof and is emitted from the light guide through the lateral surface thereof. With such an arrangement, the light intensity of the light emitting elements is thus distributed over a large light-emitting surface. Here, with its very high coupling efficiency the invention helps to reduce coupling losses so that luminance is not further reduced.

BRIEF DESCRIPTION OF THE DRAWINGS

The invention will now be described in more detail by way of exemplary embodiments and with reference to the accompanying figures. In the figures, the same reference numerals denote identical or equivalent elements. In the drawings:

FIG. 7 schematically illustrates a lighting device comprising an optical arrangement according to the invention;

FIGS. 8 to 10 show different configurations and geometries of the first and second optical elements;

DETAILED DESCRIPTION

Figure 1:
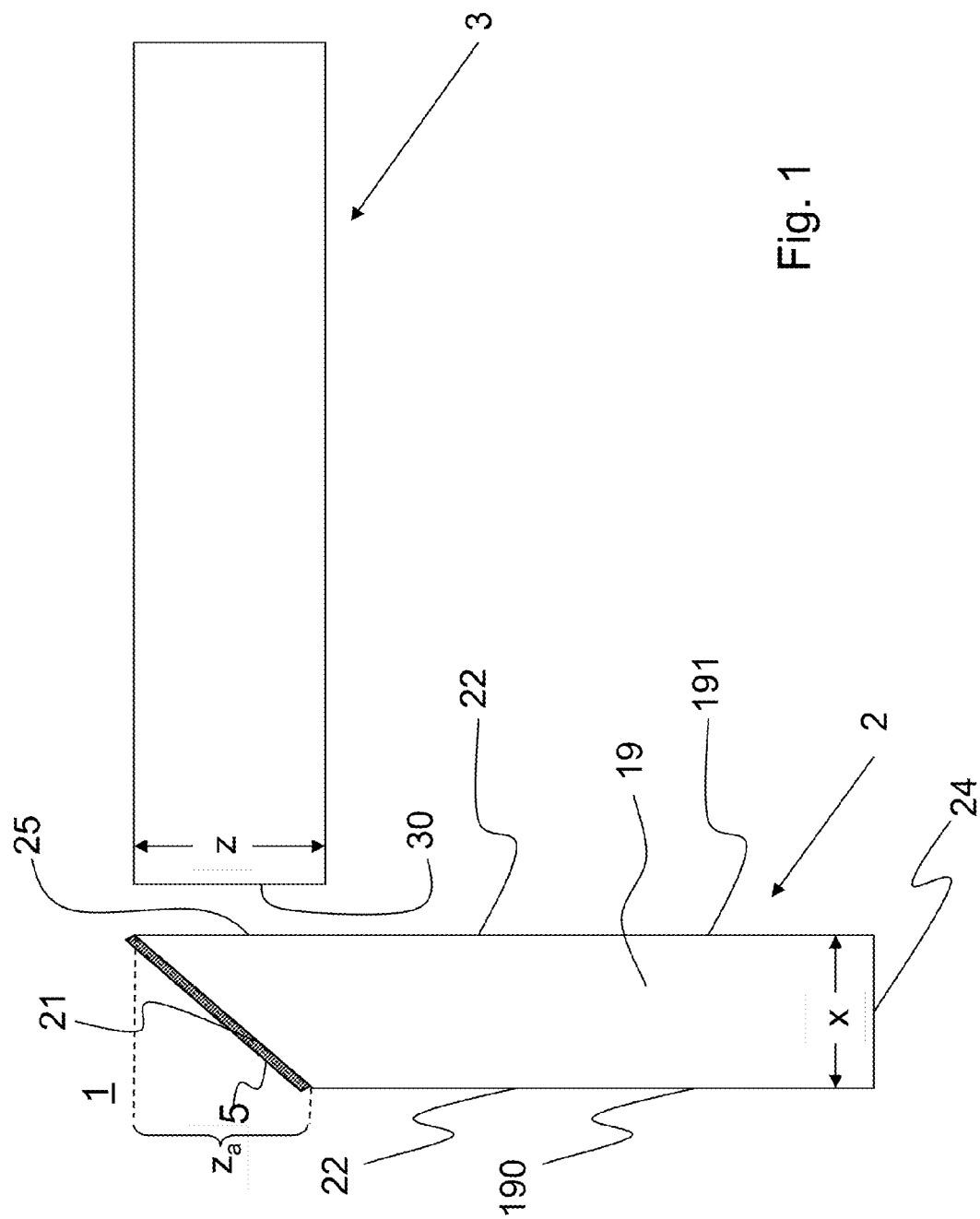
FIG. 1 schematically illustrates an optical arrangement according to the invention.

FIG. 1 schematically illustrates an optical arrangement 1 according to the invention which comprises a first optical element 2 and a second optical element 3. The first optical element 2 is a light guide 19 having walls 22, a light entry area 24, and a light exit area 25. Light exit area 25 is located opposite an inclined bevel face 21 at which the light is deflected by reflection. Generally, without being limited to the particular embodiment illustrated in FIG. 1, the bevel face may be provided as a mirror face for this purpose. It may comprise a dichroic or a metallic coating (e.g. of aluminum or silver), and the metallic coating may optionally be protected against corrosion by a further layer (e.g. $SiO_2$). The mirror function may as well be achieved by adhesively bonding a mirror or a reflective foil.

A mirror function of the bevel face is particularly preferred for all embodiments. With a mirror face 5 at bevel face 21, even those rays are reflected for which the condition for total internal reflection is no longer fulfilled because of a steep incidence angle. As a result of the geometric dimensioning of width x and height z of the first and second optical elements according to the aspect ratio of the invention, even these rays will reach the second optical element, at least partially, via the mirrored bevel face 21.

Conduction of light in the first optical element 2 occurs by total internal reflection of the light injected into the light guide 19 at light entry area 24, on the walls 22 of light guide 19.

For light guide 19, materials are preferred which have a refractive index for visible light of at least 1.4, preferably at least 1.5.

In a cross-sectional view, the walls 22 of the first optical element are defined by two faces 190, 191. Face 191 includes the light exit area 25 and is therefore longer than face 190.

The light entry area 24 has a width x that is measured in the direction along the intersection of the light entry area 24 with the plane of light deflection at bevel face 21.

In a preferred embodiment, the bevel face 21 extends at an angle of 45° relative to the longitudinal extension of the light guide, so that the light conducted in light guide 19 is deflected by 90° at the bevel face 21.

The second optical element 3, which may for example be another light guide, has a light entry aperture 30 which is either located on the light exit area 25 of the first optical element 2 or faces the light exit area 25. Light entry aperture 30 has a height z that is measured in the direction along the intersection of the light exit area 25 of the first optical element 2 with the plane of light deflection at bevel face 21 of the first optical element 2.

The shape of light entry aperture 30 of the second optical element 3, here, has an aspect ratio from 0.8:1 to 1.2:1, preferably from 0.9:1 to 1.1:1, most preferably of 1:1, for two mutually vertical directions.

Generally, without limitation to the example illustrated in FIG. 1, expression (1) linking width x and height z with each other according to the invention furthermore results in that the height $z_a$ of the bevel face 21 as seen in the direction towards the light exit area 25 of the first optical element 2 or projected to the light exit area 25, is unequal to and in particular smaller than the height z of the entry aperture of the second optical element. This smaller height $z_a$ as compared to the height z of the entry aperture of the second optical element 3 is indicated in FIG. 1. Thus, seen in a viewing direction opposite to the propagation of light, the bevel face does not completely overlap the entry aperture. Surprisingly, however, it is just this arrangement which results in a high efficiency in terms of the proportion of light that reaches and enters into the entry aperture.

Figure 2:
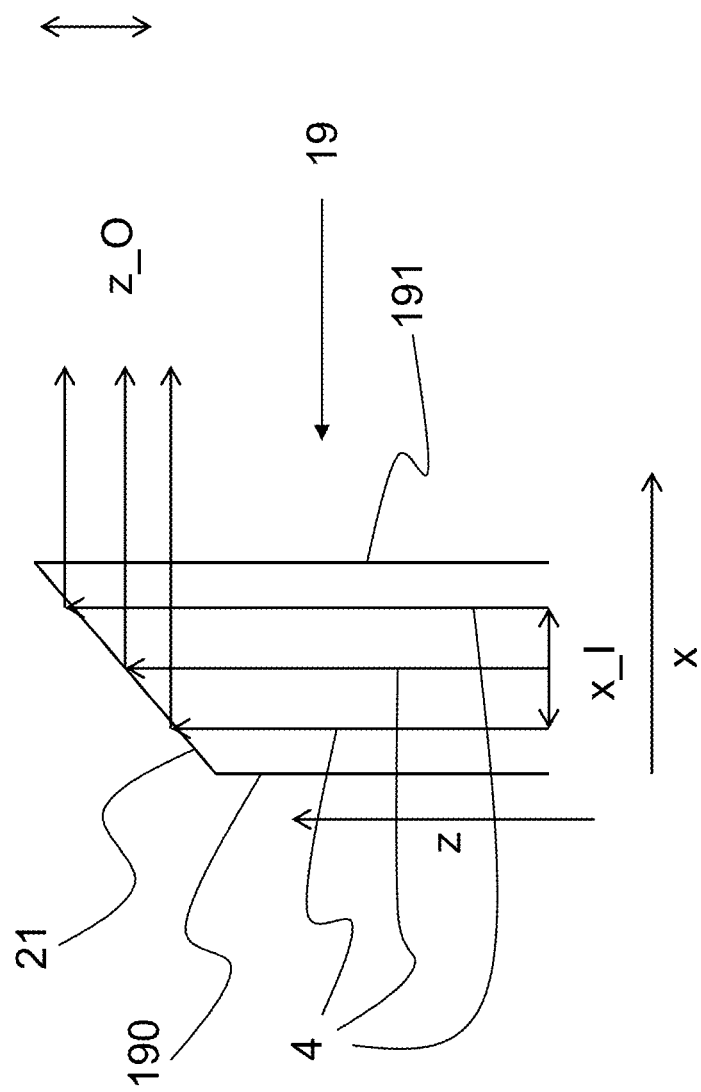
FIG. 2 schematically illustrates the beam path in a light guide with an oblique reflector.

FIG. 2 schematically illustrates the beam path in a light guide 19 having faces 190, 191 and bevel face 21. Light beams 4 are injected into light guide 19 and propagate in z-direction towards bevel face 21. At bevel face 21, the light beams 4 are reflected by an angle of 90° so that they will propagate in x-direction after having been reflected at bevel face 21.

If the incident light beams 4 have a width x_I and the exiting beams after reflection have a width z_O, the input is apparently imaged to the output, so that x_I=z_O applies.

FIG. 2 only shows the case of parallel incident light beams 4, for the sake of simplicity. More generally, light beams are also incident at an angle at light entry area 24. Along their further path, these light beams will be totally reflected at the inner surfaces of wall 22. As a consequence thereof, a cone of light is emanating from the inner surface of bevel face 21.

Figure 12:
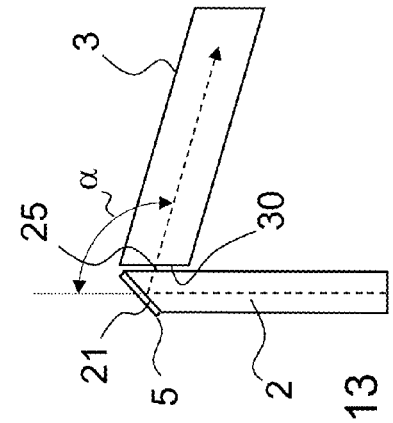
FIG. 12 shows an optical arrangement with a deflection angle smaller than 90°.
Figure 13:
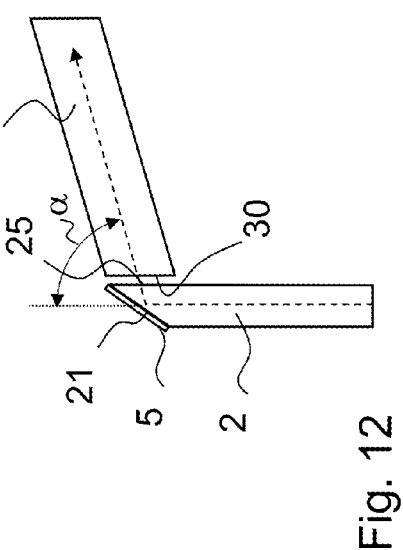
FIG. 13 shows an optical arrangement with a deflection angle greater than 90°.

FIG. 12 and FIG. 13 show two exemplary embodiments in which the deflection angle α is not 90°, other than in the examples of FIGS. 1 and 2. Specifically, in the example of FIG. 12 the deflection angle is an acute angle, that means it is less than 90°. Thus, the longitudinal extensions of the first and second optical elements 2, 3 are in an obtuse angle to each other. In the example illustrated in FIG. 13 the deflection angle α is an obtuse angle greater than 90°. The longitudinal extensions of the first and second optical elements are in an acute angle to each other.

Figure 3:
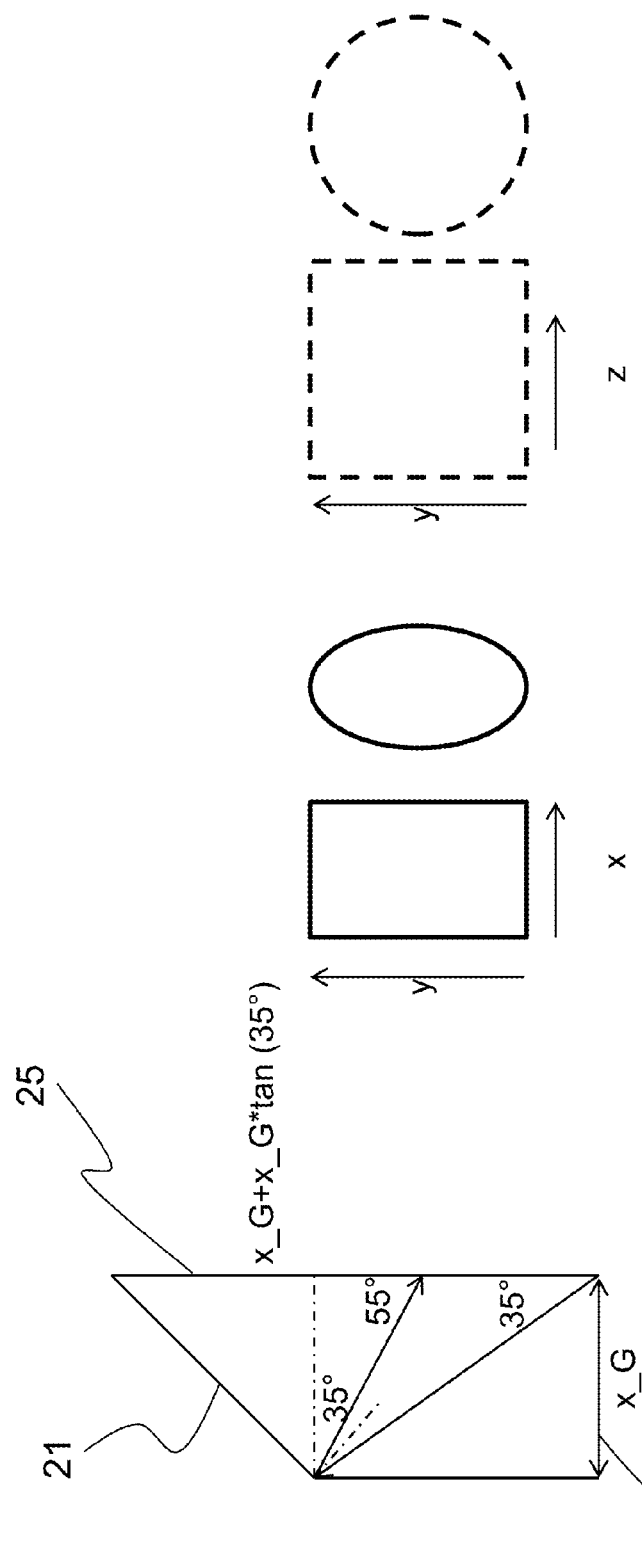
FIG. 3a schematically illustrates the geometry with a deflection of light by 90°.
FIG. 3b schematically illustrates the aspect ratios between entry and exit areas for a rectangular and for an elliptical entry area.

FIG. 3a shows the geometry of a light mixer which corresponds to the first optical element 2 in FIG. 1 for the case of deflection of light by 90° for injection into a circular light guide which corresponds to the second optical element 3 of the optical arrangement 1 of FIG. 1. Here, a refractive index for visible light of n=1.5 is assumed for the material of the light mixer.

With this refractive index of n=1.5, a critical angle of 42° is obtained which corresponds to the theoretically maximum possible opening angle of the cone of light in the light mixer in case of injection via the flat base thereof. When taking into account reflection losses upon injection and the typical Lambertian emission characteristic of the LEDs, an opening angle of 35° is realistically obtained, comprising the major part of the radiation.

The width x of the light entry area will also be referred to as x_I below.

With the values mentioned, a dimension of the light exit area in z-direction, z_O, is obtained as z_O=x_I+x_I*tan(35°), or x_I=z_O/(1+tan(35°)). This means that the base of the light mixer, i.e. the light entry area 24 of the first optical element 2 in FIG. 1, is chosen so that the dimension in y-direction is approximately 1.7 times the dimension in x-direction. Since the spatial extent of the radiation cone does not change in the y-direction, an aspect ratio of 1:1 is thus achieved at the exit, because the z-dimension is also 1.7 times the x-dimension.

FIG. 3b shows these proportions of surface areas of the entry and exit areas of the first optical element 2 for the preferred case of a target aspect ratio, i.e. an aspect ratio x/z of the light entry aperture of the second optical element, of 1:1. The entry areas are shown in a plan view, i.e. in the z-direction, the direction of the injected light, so that the entry areas extend in y- and x-directions.

The entry or input area corresponds to the light entry area 24 of the first optical element 2 in FIG. 1. The exit or output area corresponds to the light exit area 25 of the first optical element 2 in FIG. 1.

In the left part, FIG. 3b schematically shows two input areas or light entry apertures of the first optical element, a rectangular and an elliptical one. In the right part, FIG. 3b shows the corresponding output areas. With a "proper" choice of the proportion between input area and output area, the rectangular input area will be imaged to a square output area, and the elliptical input area will be imaged to a circular output area.

For the aforementioned preferred case of a target aspect ratio of 1:1, a particular form of the prismatic first optical element is resulting. In this case, a specific aspect ratio is obtained for the light entry area that depends on the deflection angle of the light, regardless of whether a second optical element is arranged downstream or not. Specifically, without being limited to the specific exemplary embodiments, according to another aspect of the invention an optical element 2 is provided in the form of or comprising a prism-shaped light guide 19 obliquely beveled with a bevel face 21, wherein the first optical element 2 conducts light by total internal reflection at the wall 22 thereof and has a light entry area 24 which is defined by the non-beveled end face of the light guide 19. Light guide 19 has a light exit area 25, and the light exit area 25 is defined by a surface area of the wall 22 at that end of the light guide 19 at which the bevel face 21 is arranged, wherein the light entry area 24 of the optical element 2 has a width x measured in the direction along the intersection of the light entry area 24 with the plane of light deflection at the bevel face 21 and a depth y measured perpendicular to the width x, which meet the following relationship:

$$x/y \leq 1.5 \cdot [\tan(90°-\alpha/2) - \tan(90°-(2\cdot[\alpha/2+90°]-[180°-\arcsin(1/n)]))]^{-1}, \quad (5)$$

wherein α, again, denotes the deflection angle of the light at the bevel face 21 and n denotes the refractive index of the material of the optical element 2.

As with the other embodiments of the invention, the light exit area 25 need not be a separate face, it is only necessary that at least the surface area of the wall 22 opposite the bevel face is translucent and hence suitable as a light exit area 25.

Expression (5) given above corresponds to expression (1), except of specifying the ratio x/y of the light entry area instead of the ratio x/z of the width of the light entry area 24 to the height z of the light entry aperture of the second optical element. This is because for a target aspect ratio of 1:1, the dimensions y and z of a light entry aperture are the same and moreover the depth y is constant, so that z=y is resulting in this case. Here, again, it is preferred that the aspect ratio of the light entry area does not become too small. Therefore, it is contemplated according to a further embodiment of the invention that in analogy to expression (2) the following applies to the aspect ratio of dimensions x, y of the light entry area 24:

$$x/y \geq 0.85 \cdot [\tan(90°-\alpha/2) - \tan(90°-(2\cdot[\alpha/2+90°]-[180°-\arcsin(1/n)]))]^{-1}. \quad (6)$$

Furthermore, light deflection by 90° is also preferred in this case. Therefore, according to a further embodiment of the invention it is contemplated, in analogy to expression (3), that the bevel face is beveled at an angle of 45° relative to the light entry area, so that the deflection angle of light is 90°, in which case the following applies to the ratio of the width x to the depth y of light entry area 24 of the light guide:

$$x/y \leq 1.5 \cdot [1 + \tan(\arcsin(1/n))]^{-1}. \quad (7)$$

In analogy to expression (4), the aspect ratio is preferably additionally limited to:

$$x/y \geq 0.85 \cdot [1 + \tan(\arcsin(1/n))]^{-1}. \quad (8)$$

Figure 4:
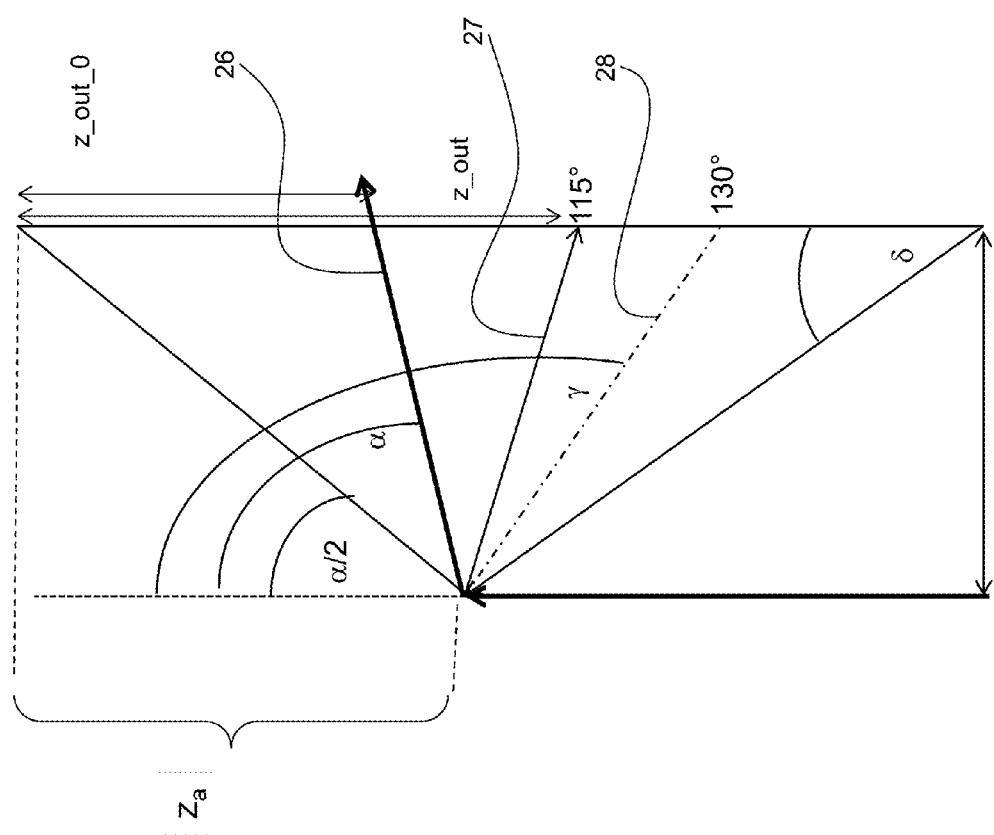
FIG. 4 illustrates the geometry for the case of a deflection of light by a general angle α.

FIG. 4 shows the geometry of a light mixer, or first optical element, for the case of a general deflection angle α. In this figure, z_out_O denotes the exit height without consideration of the beam cone. Furthermore, some specific light rays are shown: the reflected ray 26 of a ray originally running along 0°, the reflected ray 27 of a ray running along 35° in the glass, and the surface normal 28 of the mirror.

According to the invention, the expression (1) given above applies for such a deflection angle, for the dimensions x of the first optical element and z of the entry aperture of the second optical element. Preferably, a lower limit for the ratio x/z is moreover set by the expression (2) given above.

The following table lists all parameters for the calculation in the case of a general deflection angle α. In the first column, the names of the parameters are listed, while the second column contains the symbol used for the respective parameter. The third column contains the exemplary values used for the calculation, the fourth column contains the result of the calculation. The fifth column contains the results of a simplified calculation for a deflection angle α of 90° and a target aspect ratio of 1:1.

| Parameter | Symbol | Example | Calculation | Simplified calculation α = 90°, target aspect ratio 1:1 |
|---|---|---|---|---|
| Refractive index glass | n | 1.74 | preset | |
| Deflection angle | α | 80° | preset | 90 |
| Output y | y_out | | preset | |
| Output z | z_out | | preset | |
| Position of mirror face | β | 40° | α/2 | 45 |
| Surface normal of mirror | γ | 130° | α/2 + 90° | 135 |
| Entry angle to surface normal of base | δ | 35° | arcsin(1/n) | arcsin(1/n) |
| Light direction in reference system | | 155° | 180° − arcsin(1/n) | 180° − arcsin(1/n) |
| Direction of critical ray | φ | 105° | 2*γ − (180° − arcsin(1/n)) = 2*(α/2 + 90°) − (180° − arcsin(1/n)) | 90° + arcsin(1/n) |
| Output z with parallel radiation | z_out_0 | | x_G * (tan(90° − α/2) − tan (90° − α)) = x_G*(tan(90° − β) − tan(90° − α)) | x_G |
| Output z with beam cone | z_out | | x_G *(tan(90° − β) − tan(90° − φ)) = x_G * (tan(90° − α/2) − tan(90° − (2*(α/2 + 90°) − (180° − arcsin(1/n)))) | x_G*(1 + tan(arcsin(1/n))) |
| Target aspect ration | a_set | | z_out/y_out | 1 |
| Input y | y_G | | y_out | |
| Input x | x_G | | a_set *y_G/(tan(90 − β) − tan(90 − φ)) | y_G/(1 + tan(arcsin(1/n))) |

For the ratio x/z of the width x of light entry area 24 (referred to as x_G in the table) to the height z of light entry aperture 30 the following applies according to the invention to the aspect ratio of the entry aperture for a general deflection angle α, irrespectively of the target aspect ratio:

$$x/z \leq 1.5 \cdot [\tan(90°-\alpha/2) - \tan(90° - (2 \cdot [\alpha/2 + 90°] - [180° - \arcsin(1/n)]))]^{-1}. \quad (9)$$

Preferred is a deflection angle in a range from 75° to 105°, i.e. a range of 90°±15°. It has been found that in case of a greater deviation of the deflection angle from the value of 90°, distortion and internal reflection losses become excessive.

As has been explained above with reference to FIG. 1, the height $z_a$ of bevel face 21 of the first optical element 2 projected to the light entry aperture is smaller than the height z of light entry aperture 30. The height z of entry aperture 30 corresponds to the parameter z_out in FIG. 4. According to a further embodiment of the invention, the following therefore generally applies to the ratio $x/z_a$, that is the ratio of the width x of the light entry area of the first optical element 2 to the height $z_a$ of the projection of bevel face 21 of first optical element 2 to the light entry aperture:

$$x = z_a \cdot \tan(\alpha/2). \quad (10)$$

Thus, the following results for the ratio of height $z_a$ to height z from expression (1) and expression (10):

$$z_a/z \leq 1.5 \cdot [\tan(\alpha/2) \cdot [\tan(90° - \alpha/2) - \tan(90° - (2 \cdot [\alpha/2 + 90°] - [180° - \arcsin(1/n)]))]]^{-1}. \quad (11)$$

As can be seen from the example of FIG. 1, the height $z_a$ may as well be defined as the height of the bevel face measured along the longitudinal extension of the first optical element, or as the length of the longitudinal portion of the first optical element 2 along which the bevel face is provided.

However, as stated above with reference to expression (2), the increase in efficiency decreases for large values of the dimension z, and at the same time the second optical element becomes more and more voluminous. It is therefore advantageous according to a further embodiment of the invention, to additionally set a lower limit for the ratio in expression (11), which decreases with increasing height z. Therefore, from a combination of expressions (10) and (2) the following additional condition results in accordance with a further embodiment of the invention:

$$z_a/z \geq 0.85 \cdot [\tan(\alpha/2) \cdot [\tan(90° - \alpha/2) - \tan(90° - (2 \cdot [\alpha/2 + 90°] - [180° - \arcsin(1/n)]))]]^{-1}. \quad (12)$$

For the preferred special case of a deflection angle α=90°, we get $x = z_a$. Thus the following applies:

$$x/z = z_a/z. \quad (13)$$

From expression (11) then follows:

$$z_a/z \leq 1.5 \cdot [1 + \tan(\arcsin(1/n))]^{-1}, \quad (14)$$

and from expression (12) we get as an advantageous additional condition for the special case of α=90°:

$$z_a/z \geq 0.85 \cdot [1 + \tan(\arcsin(1/n))]^{-1}. \quad (15)$$

Figure 5:
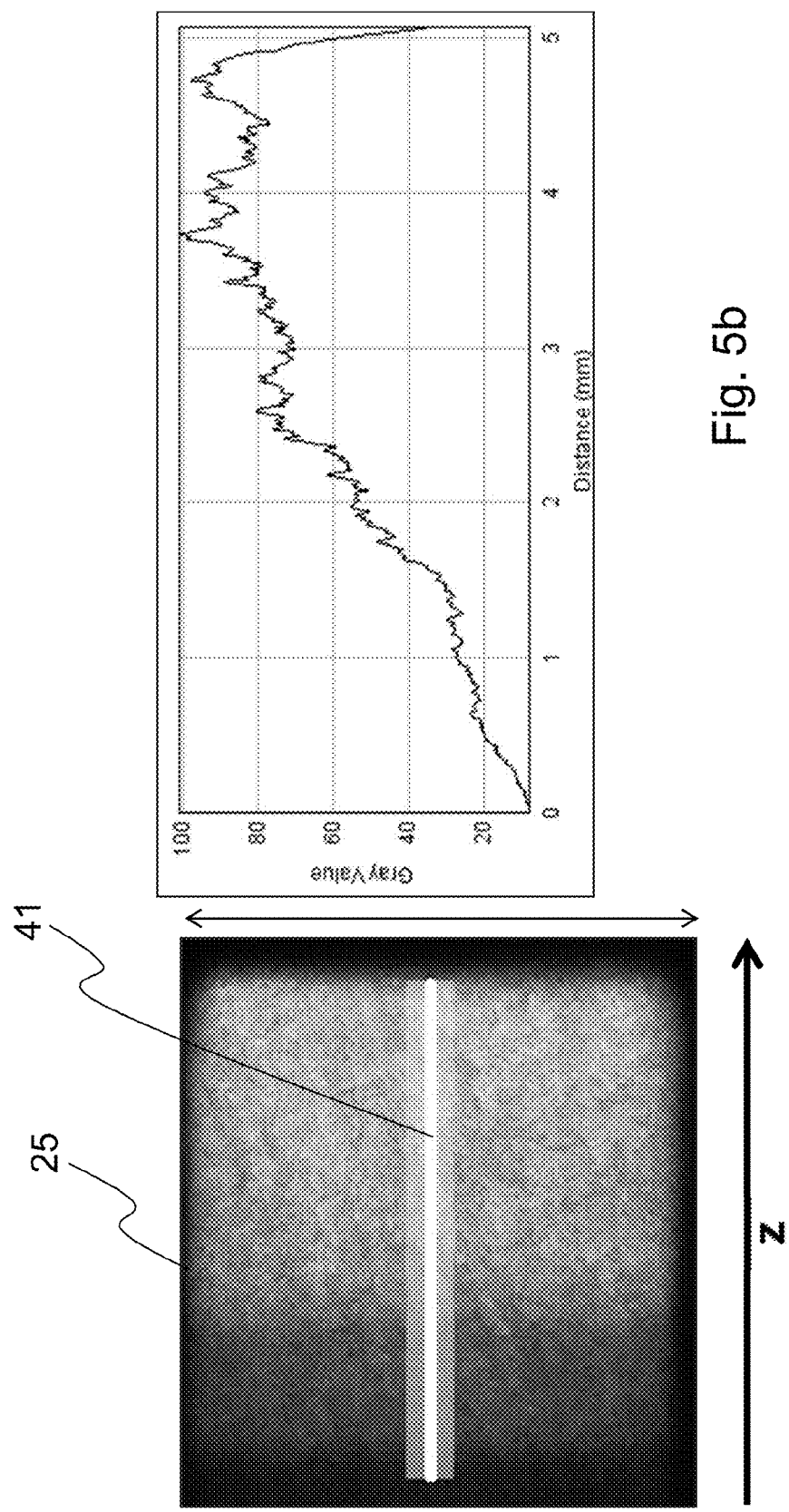
FIG. 5a is a photograph of light intensity distribution in the light exit area.
FIG. 5b is a graph of the gray value as a function of the distance to the left edge of the light exit area.

FIGS. 5a and 5b show a measured example for the glass LIBA2000 that has a refractive index of n=1.5215, which gives a critical angle of 41°. The deflection angle was chosen to be 90°. With the above formulas and for an output aspect ratio of 1:1, a calculated aspect ratio x_G/y_G=0.534 is obtained. The aspect ratio of the employed prism was x_G/y_G=3.66 mm/5.00 mm=0.732.

If an LED is used as a light source, it usually constitutes a so-called Lambertian radiator, which means that the light-emitting surface of the LED appears uniformly bright, regardless of the viewing direction.

The real ratio x_G/y_G can be chosen larger, since the LED used as the light source, as being a Lambertian radiator, emits only little radiation at high angles. Furthermore, radiation that is incident at large angles to the base of the prism is reflected for the most part.

FIG. 5a shows, in a vertical elevational view, the distribution of light intensity on light exit area 25 of the optical arrangement.

FIG. 5b is a graph showing the gray value of the light radiation along line 41 in FIG. 5a. The horizontal axis represents the distance from the left side edge of light exit area 25.

If the aspect ratios of the light entry aperture of the second optical element and of the light entry area of the first optical element are not adapted according to the invention, that means if dimensions x of the first optical element and z of the second optical element are the same, only the light intensity exiting at values of the z-coordinate greater than 2 will be injected into the second optical element, in the example of FIG. 5b that is the light intensity exiting in the range from 2 to 5 millimeters. The inventive arrangement, by contrast, is configured so that light intensity from the range between 0 and 2 millimeters is also injected. Thus, evidently, higher efficiency is achieved with the invention.

In a preferred embodiment, the light guide 19 of the first optical element 2 has the shape of a prism 20, and the light entry area 24 thereof is defined by the non-beveled base of the prism 20.

In prior art optical arrangements for mixing and redirecting light, light guides are used which have a cross-sectional shape or base (=light entry area 24 of the optical arrangement 1 of the invention) that is based on basic geometric shapes. In particular circular cross sections are used. In order to achieve better mixing of the incident light, regular hexagons are used. The basic shapes are quite beneficial for pure light mixers, in technical terms.

However, in case of additional deflection these cross-sectional shapes result in low efficiency of the optical system. These losses in efficiency are caused by several adverse properties of these systems.

These drawbacks will be explained by way of the example of a 90° deflection from z-direction to x-direction.

The highest intensity is injected perpendicularly to the surface of the base and therefore runs in parallel to the z-axis in the optical system. After having been deflected it runs in x-direction which is the desired direction for emission. In order to avoid deviation from the desired direction, the exit surface area, that is the surface area opposite the mirror, must be perpendicular to the x-axis. That means, the surface area must lie in a plane in x-y-direction. With a round or hexagonal base of the light guide this is not feasible.

A further disadvantage of a circular or hexagonal base is that a downstream optical element that has a flat entry face, such as e.g. a light guide or a plano-convex lens, cannot be placed as close as possible to the exit surface area at each exit point of the radiation. Therefore, the emitted radiation can diverge, with the result of either a diluted etendue or the need for a further optical element for collecting the radiation.

In order to avoid the aforementioned drawbacks, the invention departs from regular geometric shapes in the manner described below.

The cross-sectional area of light guide 19 has a shape with dimensions monotonically expanding in a direction from the surface facing away from the second optical element 3 towards the second optical element 3 and thereby strictly monotonically expanding in at least one section along this direction.

It should be noted in this context that a rectangular cross section is a borderline case, since the width of the base of the light guide is constant in this case. Although a constant function is monotonic, it is not strictly monotonic, other than in the above-mentioned embodiment of the invention.

If a base has the shape of a regular hexagon, the dimension of the base would even be strictly decreasing in some region, which leads to the aforementioned disadvantages.

Figure 6:
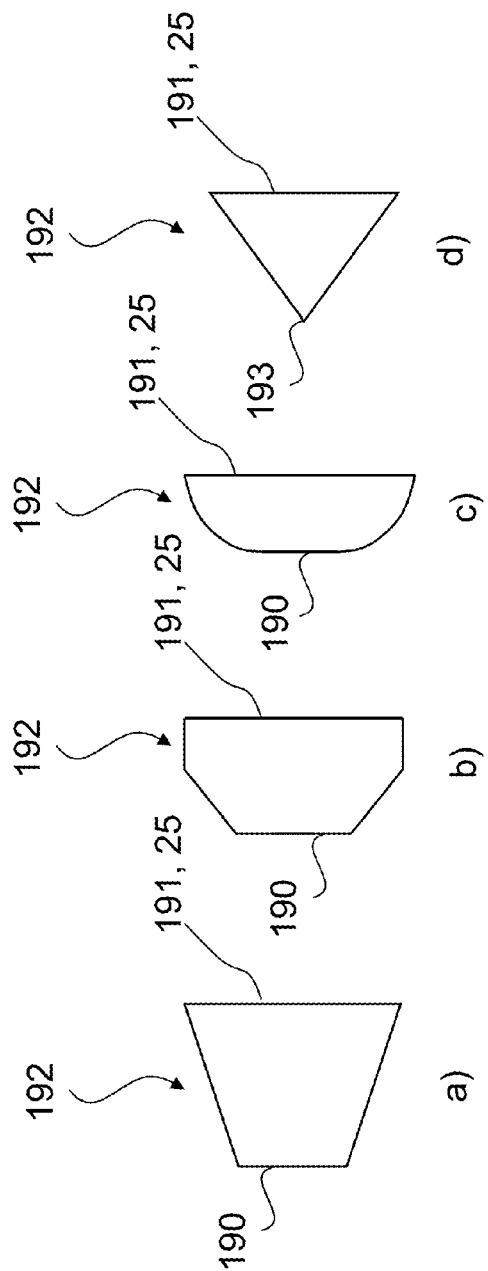
FIG. 6 shows different shapes of the base of the light guide of the optical arrangement according to the invention.

FIG. 6 shows four different bases or cross-sectional areas 192 of the light guide 19 according to further embodiments of the invention. These embodiments are based on the fact that the cross-sectional area of the light guide 19 has a shape with a dimension monotonically expanding in a direction from the surface facing away from the second optical element 3 towards the second optical element 3, and strictly monotonically expanding in at least one section along this direction.

Part a) of FIG. 6 shows a cross-sectional area with a width that is monotonically increasing over the entire extension of the light guide.

Part b) of FIG. 6 shows a cross-sectional area with a width that is initially strictly monotonically increasing, from left to right in the drawing, and then remains constant.

In the exemplary embodiments of parts a) and b) of FIG. 6, the light guide has flat wall sections. However, it is as well possible to provide rounded walls, as shown in the example in part c) of FIG. 6. In the cross-sectional area of the light guide of this exemplary embodiment, the wall sections in which the cross-sectional dimension is strictly monotonically increasing are rounded.

Part d) of FIG. 6 shows a triangular base. Accordingly, there is no face existing opposite to light exit area 25, rather, the cross section widens starting from an edge 193 toward face 191.

As has been illustrated with reference to FIG. 1 above, face 191 includes the light exit area 25. All exemplary embodiments of FIG. 6 have in common that due to the monotonic and at least partially strictly monotonic expansion of the dimension of the cross section toward light exit area 25 (i.e. from left to right with the illustrated orientation of the exemplary embodiments), the cross section 192 has its largest dimension at the light exit area 25, or the associated face 191.

FIG. 7 schematically illustrates a lighting device 100 of the invention comprising an optical arrangement 1. Placed in front of light entry area 24 of the first optical element 2 of optical arrangement 1, the lighting device 100 comprises a plurality of light-emitting elements 50, 51, 52, 53, 54, which inject their light into light entry area 24. The light-emitting elements 50, 51, 52, 53, 54 are, for example, semiconductor light-emitting elements, such as LEDs. Light-emitting elements 50, 51, 52, 53, 54 differ from each other in the color of the emitted light. In this sense, even different shades of white are considered as different colors or hues. For example, two white-light LEDs may be provided, which emit light of different color temperatures, for example two white-light LEDs that emit white light of 2700 K and 7000 K, respectively.

For example, when using a four-color LED array, a wide color space can be covered. In this case, at least one red emitting LED, at least one green or yellow emitting LED, at least one blue emitting LED, and at least one white light emitting LED is provided. In this way it is possible, for example, to modify the color temperature of white light by admixing the light from one or more of the red, green, and blue emitting LEDs to light from one or more white emitting LEDs. For light-emitting diodes and laser as the semiconductor light-emitting elements, the following spectral ranges are preferred for the emitted light: blue light: wavelength from 430 nm to 480 nm, green light: wavelength from 500 nm to 560 nm, red light: wavelength of at least 600 nm, preferably from 600 nm to 660 nm.

In the case of lighting device 100, the second optical element 3 of the optical arrangement 1 is formed by a light guide 31 that has an end face facing the light exit area 25 of the first optical element 2, which end face defines the light entry aperture 30. Depending on the exact application configuration, reflection losses may be minimized by cementing surface areas 25 and 30 together, so that overall efficiency can be increased. However, this implies additional cost and may limit the resistance to temperature changes, if the basic structure of the lamp exhibits a different thermal expansion behavior than the glass rod.

Along its longitudinal extension, the light guide 31 comprises light-scattering features 310 which partly scatter the light injected into the light guide 31 in a manner so that the critical angle of total internal reflection is exceeded, so that the scattered light exits from the lateral surface of light guide 31. Thus, the light guide 31 becomes a linear or elongated light source emitting light throughout its longitudinal extension. Particularly suitable are light-scattering features which are applied on the lateral surface of the light guide. Suitable for this purpose is a diffusely reflecting coating. In this case, the coating includes reflective particles as the light-scattering features.

As shown in FIG. 7, it is as well possible that the light-scattering features 310 are applied to only a portion of the lateral surface. In this manner, light emission on the opposite, non-coated side of the light guide 31 is promoted. This is of advantage if the light guide is arranged on or in a wall, ceiling or floor. Without being limited to the particular example shown in FIG. 7, the light-scattering features are preferably arranged on the side of the lateral surface facing the light emitting elements 50, 51, 52, 53, 54. In this way, the first optical element may be installed in the wall, ceiling or floor and thus will be concealed.

It can be seen that in the region of the prism, normally no light is emitted in z-direction like along the rod because of the coating. Therefore, when a plurality of such light sources are combined, the luminous line may be interrupted, which possibly produces undesirable effects in the light field. These effects can be reduced by designing the mirror coating on face 21 so that a portion of the light is transmitted in z-direction or in a direction with a major z-component. This is implemented particularly easily, for example, by mirror-coating not the entire face (e.g. by omitting the peripheral region).

The light guide 19 of the first optical element 2 and/or the light guide 31 of the second optical element 3 may be a glass or plastic rod. The light guides may be jacketed with a material having a lower refractive index or may have no jacket at least in sections thereof.

Light-emitting elements 50, 51, 52, 53, 54 are connected to an electronic control unit (not illustrated herein) which allows to control the brightness of the light-emitting elements, even separately from each other.

In the embodiments described above, the coordinate system has been chosen so that, without loss of generality, the deflection of light at the bevel face take place in the x-z plane. The extension of the first and second optical elements in y-direction is preferably the same. A smaller dimension of the first optical element in y-direction reduces the injection area and thus the efficiency of injection and entails an unnecessarily large dimensioning of the second optical element and hence less favorable properties, for example in terms of installation space, weight, and costs.

A larger extension of the first optical element in y-direction with respect to the second optical element means that light runs laterally past the second optical element and thus efficiency is reduced.

On the other hand, for structural reasons, slight deviations of the depth y of the first optical element (also referred to as y_G above) or of the light entry area and of the depth y of the light entry aperture of the second optical element may be of advantage. Generally, without being limited to the illustrated exemplary embodiments, it is therefore preferred that the depth y_G of the light entry area 24 of the first optical element and the depth y2 of the light entry aperture of the second optical element define a ratio y_G/y2 ranging from 0.85 to 1.15, preferably from 0.9 to 1.11.

For the aforementioned reasons, it is moreover generally favorable to adapt the depths of light entry area 24 and light exit area 25. Accordingly, what applies to the light guide of the first optical element according to one embodiment of the invention is that the ratio y/y_out of the depth y (also referred to as y_G above) of the light entry area 24 of the first optical element and the depth y_out of the light exit area 25 ranges from 0.85 to 1.15, preferably from 0.9 to 1.11.

FIG. 8 is a view taken along the x-axis for the case that the geometry of prism 20 and light guide 18 of the second optical element 3 coincide. Due to the rectangular geometry of prism 20 and the circular geometry of light guide 18, there are non-overlapped areas 23 remaining.

Since the two geometries need not coincide, a somewhat greater extent in z-direction might be advantageous, for example for the case of a circular light guide, because the positive effects outweigh the negative ones. This case is shown in FIG. 9. An additional overlapped area 32 and a non-covered area 33 of the light guide 18 of the second optical element 3 are resulting.

In the same context, a slight displacement of the second optical element in z-direction upwards is also advantageous, since the areas of high intensity are in the upper region of the exit area, as has been described in more detail in conjunction with FIGS. 5a and 5b before. FIG. 10 shows this case of an circular light guide 18 enlarged in z-direction and shifted upwards.

It can furthermore be seen from FIGS. 8 to 10, that the cross-sectional shape of the light entry aperture of the second optical element differs from the cross-sectional shape of the light entry area of the first optical element not only in terms of the aspect ratio, but may additionally constitute some other geometric figure. For example, the light entry area may generally have a polygonal shape, while the light entry aperture of the second optical element may have a circular shape, such as preferably the light entry face of a light guide.

Figure 11:
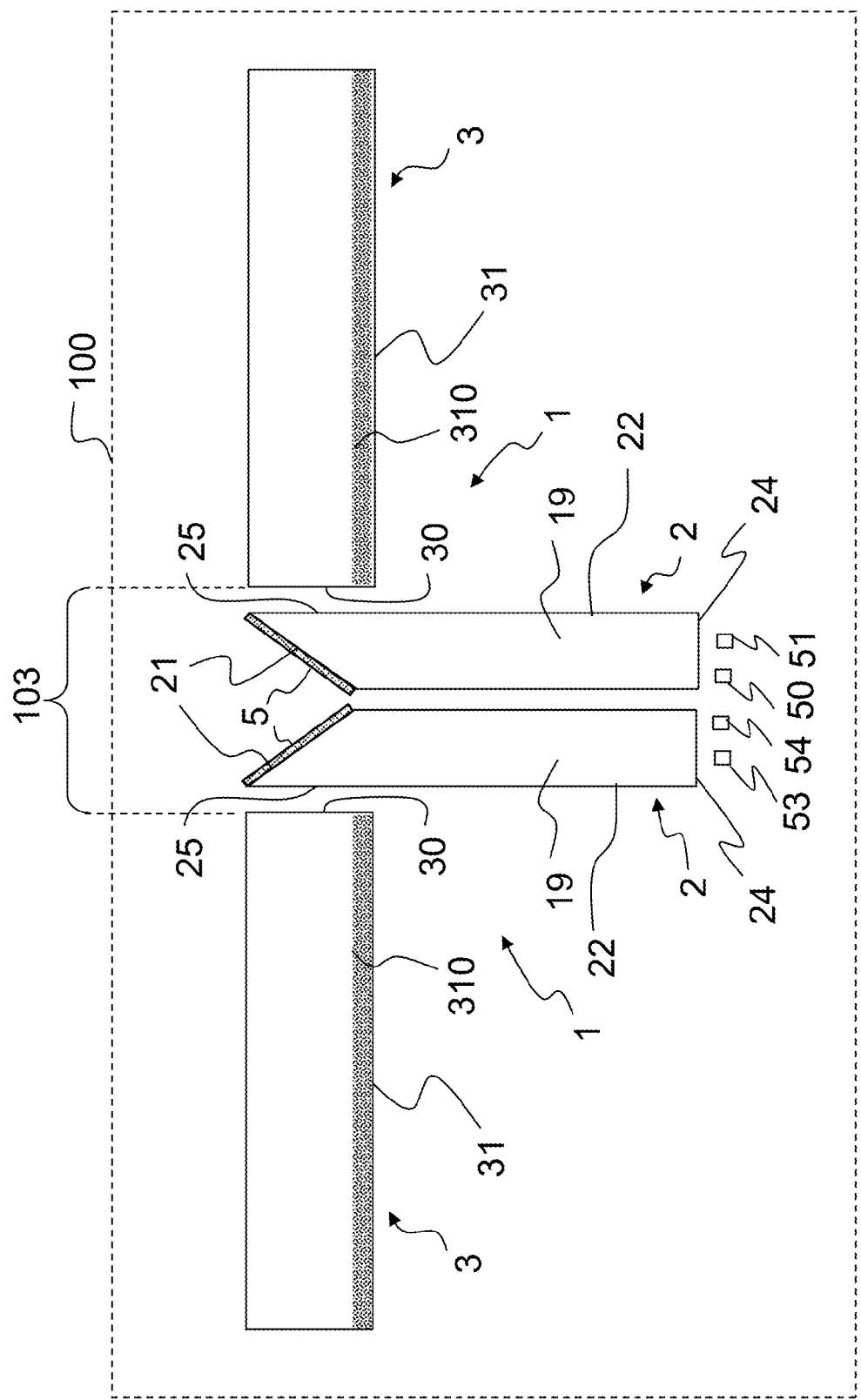
FIG. 11 illustrates a modification of the lighting device shown in FIG. 7.

FIG. 11 shows a modification of the embodiment of a lighting device 100 illustrated in FIG. 7. This lighting device 100 comprises at least two, preferably more optical arrangements. Each of the optical arrangements comprises a light guide 31 as the second optical element. The light guides 31 are arranged in a row or one behind the other so that their light entry apertures 30 are spaced apart from each other. The first optical elements 2 of optical arrangements 1 are arranged side by side so that in the intermediate space 103 between the light entry apertures 30, the light exit areas 25 are facing in opposite directions and are facing the opposed light entry apertures 30 of the light guides 3. The first optical elements each have associated therewith their own light-emitting elements, preferably a plurality thereof, 50, 51 and 53, 54, respectively, which differ from each other in terms of the color of the emitted light, and the first optical elements 2 are furthermore preferably arranged so that the juxtaposed surfaces of the walls 22 of first optical elements 2 are separated from each other, especially without contact between the surfaces, so that each optical element conducts the light of the light-emitting elements associated therewith and crosstalk between the light conducted in one lighting device and the neighboring lighting device 1 is avoided. In this manner it is possible to separately adjust the individual lighting devices in terms of brightness and/or color. Moreover, with the series arrangement of light guides 31 an elongated, linear light source is obtained. In order to permit light to reach the intermediate space 103, it is for example contemplated according to a further embodiment of the invention that the mirror coatings 5 on the bevel faces are partially transmissive. This may be achieved by a partially reflective mirror coating 5 and/or by a bevel face 21 only partially covered by a mirror coating 5.

It will be apparent to those skilled in the art that the invention is not limited to the exemplary embodiments but can be varied in many ways within the scope of the subject matter of the claims. For example, in the exemplary embodiments of FIG. 1 and FIG. 7 first optical elements 2 are provided which deflect the light by 90° toward the second optical element 3. However, other angles may be used as well.

LIST OF REFERENCE NUMERALS

1 Optical arrangement
2 First optical element
3 Second optical element
4 Light beam
5 Mirror face
18 Light guide
19 Light guide
20 Prism
21 Bevel face
22 Wall
23 Non-overlapped area
24 Light entry area
25 Light exit area
26 Reflected ray of a ray originally running along 0°
27 Reflected ray of a ray running along 35°
28 Surface normal of the mirror
30 Light entry aperture
31 Light guide
32 Additionally overlapped area
33 Non-covered area
41 Section line
50, 51, 52, 53, 54 Light-emitting elements
100 Lighting device
103 Intermediate space
190, 191 Faces
192 Cross-sectional area of 19
193 Edge
310 Light-scattering features

What is claimed is:
1. An optical arrangement, comprising:
a first optical element in the form of or comprising a light guide obliquely beveled with a bevel face; and
a second optical element, wherein the first optical element conducts light by total internal reflection at a wall thereof, has a light entry area defined by a non-beveled end face, and has a light exit area defined by a surface area of the wall at that end of the light guide at which the bevel face is arranged, and wherein the second optical element has a light entry aperture defined by an end face thereof, the light entry is arranged on or faces the light exit area of the first optical element, wherein the light entry area of the first optical element has a width x measured in a direction along an intersection of the light entry area with a plane of light deflection at the bevel face, wherein the light entry aperture of the second optical element has a height z measured in a direction along an intersection of the light exit area of the first optical element with a plane of light deflection at the bevel face, wherein the width x and the height z meet the following relationship:

$$x/z \leq 1.5 \cdot [\tan(90°-\alpha/2) - \tan(90° - (2 \cdot [\alpha/2 + 90°] - [180° - \arcsin(1/n)]))]^{-1},$$

wherein α denotes a deflection angle of light at the bevel face and n denotes a refractive index of material of the first optical element, and wherein the width x and the height z meet the following relationship:

$$x/z \geq 0.85 \cdot [\tan(90°-\alpha/2) - \tan(90° - (2 \cdot [\alpha/2 + 90°] - [180° - \arcsin(1/n)]))]^{-1},$$

2. The optical arrangement as in claim 1, wherein the deflection angle at the bevel face of the first optical element ranges from 75° to 105°.

3. The optical arrangement as in claim 1, wherein the light guide has the shape of a prism and the light entry area is defined by a non-beveled base of the prism.

4. The optical arrangement as in claim 1, wherein the light guide has a cross-sectional area with a shape having dimensions monotonically expanding in a direction from a surface facing away from the second optical element towards the second optical element, and strictly monotonically expanding in at least one section along this direction.

5. The optical arrangement as in claim 4, wherein the light guide has two opposite flat faces, wherein one of the faces includes the light exit area, and wherein the face that includes the light exit area is wider than the opposite face.

6. The optical arrangement as in claim 1, wherein the bevel face extends at an angle of 45° relative to a longitudinal extension of the light guide so that light conducted in the light guide is deflected by 90° at the bevel face.

7. The optical arrangement as in claim 6, wherein the height z and the width x meet the following relationship:

$$x/z \leq 1.5 \cdot [1 + \tan(\arcsin(1/n))]^{-1}.$$

8. The optical arrangement as in claim 1, wherein the bevel face is a mirror face.

9. The optical arrangement as in claim 1, wherein the refractive index of the material of the first optical element for visible light is at least 1.4 and not more than 2.0.

10. A lighting device, comprising:
the optical arrangement as in claim 1;
a plurality of light-emitting elements that differ from each other in the color of the emitted light, wherein the plurality of light-emitting elements are arranged so as to inject light into the light entry area of the first optical element.

11. The lighting device as in claim 10, wherein the second optical element comprises a second light guide into which light is injected which is emitted from the first optical element, wherein the second light guide has light-scattering features along a longitudinal extension, which scatter the injected light out of the second light guide.

12. The lighting device as in claim 11, wherein the second optical element is formed by the second light guide and the light entry aperture is defined by an end face of the second light guide facing the light exit area of the first optical element.

13. The lighting device as in claim 11, further comprising at least two optical arrangements, wherein each of said at least two optical arrangements comprises the second light guide as the second optical element and the light guides are arranged successively so that the light entry apertures are spaced apart from each other, and wherein the first optical element of each of said at least two optical arrangements are arranged side by side so that in an intermediate space between the light entry apertures, the light exit areas are facing in opposite directions and are facing the opposed light entry apertures of the light guides.

14. An optical arrangement, comprising:
a first optical element in the form of or comprising a light guide obliquely beveled with a bevel face; and
a second optical element,
wherein the first optical element conducts light by total internal reflection at a wall thereof, has a light entry area defined by a non-beveled end face, and has a light exit area defined by a surface area of the wall at that end of the light guide at which the bevel face is arranged, and
wherein the second optical element has a light entry aperture defined by an end face thereof, the light entry is arranged on or faces the light exit area of the first optical element,
wherein the light entry area of the first optical element has a width x measured in a direction along an intersection of the light entry area with a plane of light deflection at the bevel face,
wherein the light entry aperture of the second optical element has a height z measured in a direction along an intersection of the light exit area of the first optical element with a plane of light deflection at the bevel face,
wherein the width x and the height z meet the following relationship:

$$x/y \leq 1.5 \cdot [\tan(90°-\alpha/2) - \tan(90° - (2 \cdot [\alpha/2 + 90°] - [180° - \arcsin(1/n)]))]^{-1},$$

wherein α denotes a deflection angle of light at the bevel face and n denotes a refractive index of material of the first optical element, and
wherein the light entry aperture has a shape with an aspect ratio from 0.8:1 to 1.2:1 for two mutually perpendicular directions.

15. An optical arrangement, comprising:
a first optical element in the form of or comprising a light guide obliquely beveled with a bevel face; and
a second optical element,
wherein the first optical element conducts light by total internal reflection at a wall thereof, has a light entry area defined by a non-beveled end face, and has a light exit area defined by a surface area of the wall at that end of the light guide at which the bevel face is arranged, and wherein the second optical element has a light entry aperture defined by an end face thereof, the light entry is arranged on or faces the light exit area of the first optical element, wherein the light entry area of the first optical element has a width x measured in a direction along an intersection of the light entry area with a plane of light deflection at the bevel face, wherein the light entry aperture of the second optical element has a height z measured in a direction along an intersection of the light exit area of the first optical element with a plane of light deflection at the bevel face, wherein the width x and the height z meet the following relationship:

$$x/y \leq 1.5 \cdot [\tan(90°-\alpha/2) - \tan(90°-(2\cdot[\alpha/2+90°]-[180°-\arcsin(1/n)]))]^{-1},$$

wherein $\alpha$ denotes a deflection angle of light at the bevel face and n denotes a refractive index of material of the first optical element, and wherein the light entry area has depth y_G and the light entry aperture has a depth y2 that define a ratio y_G/y2, the ratio being in a range from 0.85 to 1.15.

16. An optical arrangement, comprising:

a first optical element in the form of or comprising a light guide obliquely beveled with a bevel face; and a second optical element, wherein the first optical element conducts light by total internal reflection at a wall thereof, has a light entry area defined by a non-beveled end face, and has a light exit area defined by a surface area of the wall at that end of the light guide at which the bevel face is arranged, and wherein the second optical element has a light entry aperture defined by an end face thereof, the light entry is arranged on or faces the light exit area of the first optical element, wherein the light entry area of the first optical element has a width x measured in a direction along an intersection of the light entry area with a plane of light deflection at the bevel face, wherein the light entry aperture of the second optical element has a height z measured in a direction along an intersection of the light exit area of the first optical element with a plane of light deflection at the bevel face, wherein the width x and the height z meet the following relationship:

$$x/y \leq 1.5 \cdot [\tan(90°-\alpha/2) - \tan(90°-(2\cdot[\alpha/2+90°]-[180°-\arcsin(1/n)]))]^{-1},$$

wherein $\alpha$ denotes a deflection angle of light at the bevel face and n denotes a refractive index of material of the first optical element, and wherein the following relationship applies for a ratio of the height $z_\alpha$ of a projection of the bevel face to the light exit area and the height z of the light entry aperture:

$$z_\alpha/z \leq 1.5 \cdot [\tan(\alpha/2) \cdot [\tan(90°-\alpha/2) - \tan(90°-(2\cdot[\alpha/2+90°]-[180°-\arcsin(1/n)]))]]^{-1}.$$

17. The optical arrangement as in claim 16, wherein the following relationship applies for the ratio:

$$z_\alpha/z \geq 0.85 \cdot [\tan(\alpha/2) \cdot [\tan(90°-\alpha/2) - \tan(90°-(2\cdot[\alpha/2+90°]-[180°-\arcsin(1/n)]))]]^{-1}.$$

18. An optical arrangement, comprising:

a first optical element in the form of or comprising a light guide obliquely beveled with a bevel face; and a second optical element, wherein the first optical element conducts light by total internal reflection at a wall thereof, has a light entry area defined by a non-beveled end face, and has a light exit area defined by a surface area of the wall at that end of the light guide at which the bevel face is arranged, and wherein the second optical element has a light entry aperture defined by an end face thereof, the light entry is arranged on or faces the light exit area of the first optical element, wherein the light entry area of the first optical element has a width x measured in a direction along an intersection of the light entry area with a plane of light deflection at the bevel face, wherein the light entry aperture of the second optical element has a height z measured in a direction along an intersection of the light exit area of the first optical element with a plane of light deflection at the bevel face, wherein the width x and the height z meet the following relationship:

$$x/z \leq 1.5 \cdot [\tan(90°-\alpha/2) - \tan(90°-(2\cdot[\alpha/2+90°]-[180°-\arcsin(1/n)]))]^{-1},$$

wherein $\alpha$ denotes a deflection angle of light at the bevel face and n denotes a refractive index of material of the first optical element, and wherein the light guide has a cross-sectional area with a shape having dimensions monotonically expanding in a direction from a surface facing away from the second optical element towards the second optical element, and strictly monotonically expanding in at least one section along this direction.

* * * * *